Oct. 22, 1968

C. RAMCKE 3,406,918

CONTROL AND SWITCHING DEVICE IN MECHANICALLY OR HYDRAULICALLY
OPERATED TRAVERSE-MOTION SYSTEMS IN SPINNING, SPOOLING
AND ESPECIALLY RING TWIST MACHINES

Filed June 10, 1964

INVENTOR:
CARSTEN RAMCKE
BY

ATT'YS

United States Patent Office 3,406,918
Patented Oct. 22, 1968

3,406,918
CONTROL AND SWITCHING DEVICE IN MECHANICALLY OR HYDRAULICALLY OPERATED TRAVERSE-MOTION SYSTEMS IN SPINNING, SPOOLING AND ESPECIALLY RING TWIST MACHINES
Carsten Ramcke, Wuppertal-Ronsdorf, Germany, assignor to Barmer Maschinenfabrik AG., Wuppertal-Oberbarmen, Germany
Filed June 10, 1964, Ser. No. 374,109
Claims priority, application Germany, July 26, 1963, B 72,868
9 Claims. (Cl. 242—26.3)

ABSTRACT OF THE DISCLOSURE

A device for controlling the movement of limit switches on traverse mechanisms that are used in producing windings in the textile industry. The drive of the threaded spindles is controlled by means of a photoelectric cell. A switching plate or disc having tongues or the like for interrupting a light beam striking the photoelectric cell are employed to control the movement of the limit switches. The device provides substantially lag-free control of the displacing members.

---

Figure 3:
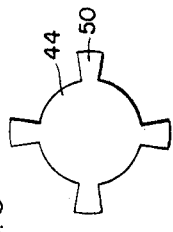
Figure 4:

The present invention is directed to control and switching means for traverse mechanisms that are used in producing windings in the textile industry. More particularly, the invention is directed to control means for mechanically or hydraulically driven traverse-motion devices that fix the beginning and the end as well as the position of the traversing stroke by means of two limit switches which are adjustable according to a predetermined program.

In mechanically or hydraulically driven traverse mechanisms, especially in ring twist machines, frequently for the limitation and control of the traverse or reciprocating stroke two limit switches are used which at the stroke ends reverse the movement of the traverse mechanism. It is also a known practice to displace the limit switches for the reasons to alter the length and/or position of the traverse stroke according to a program required for the build-up of a particular winding form or package. For the control of the displacing program there are used generally as a displacing member one or two ordinary threaded spindles on which the limit switches to be displaced or the setting members or stops actuating these are mounted. Thus, for example, in a known winding device two stops are arranged on two parallel threaded spindles. The stops are moved stepwise according to their individual program. The distance between the stops and the amount of their particular deflection on the displacing members determines the length and the position of the traverse stroke. The turning speed and the turning direction of the two displacing members (such as threaded spindles) and thereby the speed and movement direction of the stops, which correspond in their function approximately to end switches, can be set independently of each other and can, therefore, differ. The speed and movement of the stops retain, however, their original rate and direction during the entire winding operation. A reversal of the movement direction of the stops during the winding or package build-up and the driving of the traverse program associated with it for the winding build-up is not possible with such a control device. The drive of the two displacing members is derived from the traverse stroke of the ring bench. Thereby both in the selection of the constructive means and also in the spatial arrangement one is extremely dependent on the construction of the remainder of the machine.

In another known traverse system, two axially parallel adjacently situated threaded spindles likewise are used for the displacement of switching cams which correspond in their function approximately to limit switches. The drive of the threaded spindles takes place stepwise over a ratchet switching mechanism of a hydraulic working piston. This type of drive does not permit the changing of the turning direction of the threaded spindles during the winding process. For this reason the production of such cop forms as those in which the traverse stroke is shifted several times in the course of the total winding build-up from one end of the winding body to the other is not possible unless an especially complicated mechanism is additionally installed. Even then, such yarn winding bodies cannot be produced as those in which stroke reduction and stroke lengthening alternate with one another during a winding operation.

A further drawback of the known devices lies in the fact that after running through a complete traverse program individual members of the total traverse mechanism, with more or less great expenditure of time, have to be restored by hand to their starting positions or gear parts have to be changed, in order to make it possible to begin the next winding build-up.

The invention has as its principal object the development of a control and switching device which makes it possible in a few moments to set the usual traverse programs and their variants, and, moreover, makes it possible to restore the traverse mechanism to its starting position before the commencement of the partciular traverse program.

It is another object to develop a control and switching device which makes it possible to carry out the resetting of the switching system in a convenient manner when a change is made in the traverse program.

In general, the subject invention comprises the discovery of a new system for controlling the movement of the limit switches on the displacing means. In this system, the drive of the displacing members (for example, threaded spindles) is controlled according to the selected program by means of a photoelectric or electromagnetic impulse-producing switching member, wherein a switching plate or disc having switching tongues, switching windows, or the like, is employed for the purpose of interrupting the light beam striking the photoelectric cell, or for the purpose of altering the induced magnetic flux. The switching plate or disc can be made of metal or some other suitable material. The switching members operate without contact, and, accordingly, there is assured on the part of the impulse-producer an exact and nearly lag-free control of the displacing members. The use of photoelectric units or electromagnetic inductors working in conjunction with the switching plates have proven to be surprisingly well suited for desired winding forms. The switching tongues or switching windows of the plates can be designed so as to cause the formation of particular winding forms. While such devices are preferred, it is possible to use other contactless switching members.

According to a preferred embodiment of the invention, the photoelectric or electromagnetic impulse-producers and the rotating switching plate are settable with respect to each other in their position or they are adjustable according to the program. Additionally, the width of the switching tongues or switching windows can differ depending upon the distance from the axis of rotation of the plate. In particular, the tongues or windows can be designed in the form of a particular curve. Finally, the switching plate may consist of two or more partial discs provided with switching tongues which are turnable and securable with respect to each other. In this manner there is provided a simple means for varying the impulse sequences by lengthening or shortening the time of the impulses. Through this arrangement and according to the subject invention, the speed of the stroke lengthening and stroke diminution can be altered and thus the structure and form of the winding body can be improved in the desired manner.

In a further preferred embodiment of the invention, a pole-reversible electric motor is provided as the drive for the impulse-producing system. The motor is independent of the main drive of the machine and of the thread drive and is especially well suited for changes in the turning rate and of the turning direction. Through the use of its separate motor it is possible not to expose the control and switching device to possible fluctuations in the operating behavior of the machine and, on the other hand, to provide a simple additional gearing means for varying the control program with respect to superpose control impulses by means of the turning rate change and reversal. This motor, in a further development of the invention, drives simultaneously a switching coupling for the drive of the adjusting members of the limit switches. The in-and-out displacement of the switch coupling takes place through the switching impulses of the impulse-producer in which system then the two displacing members are drivable in common over the engaged switching coupling my means of a gear in which, in the case of independently movable displacing members, for one of the displacing members a reversible gear is provided. In this manner the speeds of the limit switch movements can be altered independently of those of other movement mechanisms of the machine and the manifold possibilities of the program control device can be completely transmitted and optimally utilized.

Inasmuch as the requirements of practical use make it appear desirable still further to increase the variation possibilities for the configuration of the winding (package) as, for example, by differing rotary angle per control impulse of the one displacing member with respect to the other, it is provided that the reversing gear in the drive of the displacing member is designed as an infinitely adjustable or regulatable gear. Moreover, if it is desired, the two displacing members can be arranged so as to be additionally slidable in or against their particular conveyance direction according to the program in a manner in itself known. Furthermore, it is proposed that the limit switches provided for the determination of beginning and end, and also the position of the traverse stroke, be provided with switching means or be caused to act on switching means which, in turn, directly or over time relays at the traverse points actuate the hydraulic devices present for the traverse movement or additionally arranged adjusting device for producing a time-limited increase of the stroke speed. Hereby it is possible to determine within the closest tolerances the gradient at any winding diameter and to accommodate the winding ends to the spool shell form.

The above described feature of the invention is of special advantage in the processing of artificial silk and chemical fibers, since the danger of the slipping off of individual thread windings from the slope of the winding body is extremely great in the case of the fiber types mentioned due to their smooth surface characteristics. It has further proved that the drawing off of the thread material from such windings formed in this manner takes place with especially low tension fluctuations, from which fact there result good effects for the further processing of the material up, inclusively, to the end product. Furthermore, through this advantageous shaping of the outer winding form it is achieved that in case of thread breakage, regardless of the stage of the winding build-up in which it takes place, the gradient angle of the windings made on the subsequently emplaced shells always corresponding to a good winding formation.

Figure 2:
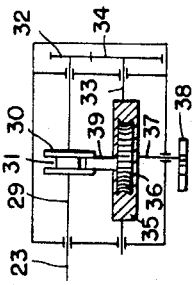
Figure 1:
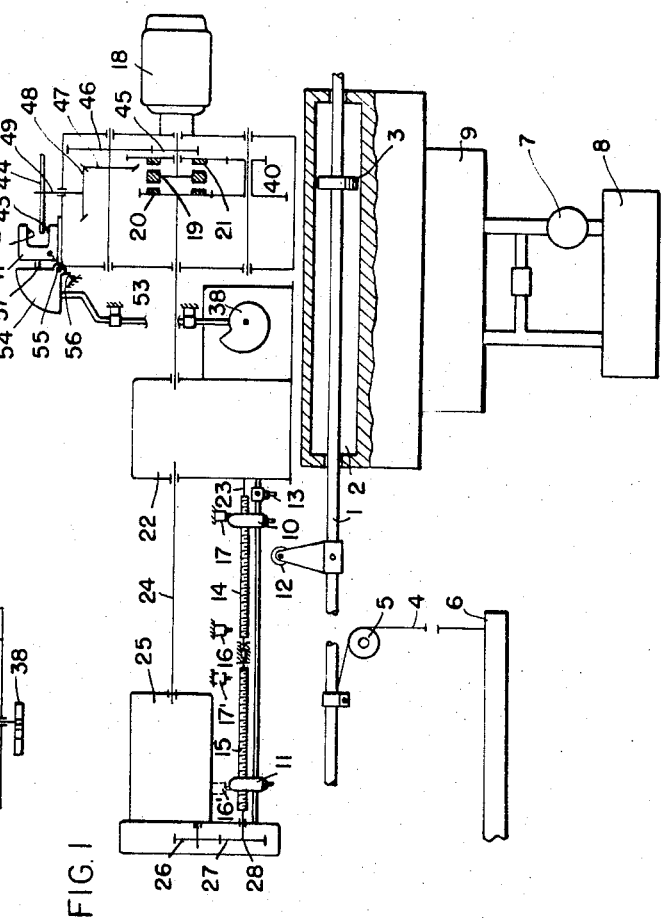

The invention is further illustrated in the attached drawings in which:

FIGURE 1 schematically shows a control and switching device according to the invention with a hydraulically driven traverse mechanism;

FIGURE 2 schematically shows a special additional gear for the adjusting or displacing system; and FIGURES 3 to 6 schematically set forth examples of switching discs of the adjusting system.

In a ring twist machine the raising and lowering of the ring or spindle bank necessary for the building up of a winding of known winding type takes place by means of the traverse mechanism which transmits its program controlled reciprocating movement over connecting members to the bench to be moved. In the example of execution represented, the hydraulically driven traverse mechanism is shown as including piston rod 1 which, in a known manner, is pressed to the right or to the left by means of working piston 3 conducted in cylinder 2 of the hydraulic reversing gear, for which purpose on cylinder 2 a corresponding control line system for the pressure fluid is connected. To piston rod 1 there is attached the end of a draw band 4 which, conducted over one or more deflection rollers 5, carries the ring or spindle bench 6 suspended at its other end. The pump 7, the pressure fluid container 8 and the hydraulic devices and lines grouped in the casing 9 (shown closed) are of conventional arrangement and construction.

The hydraulic forces necessary for the raising and lowering of the ring bench are generated by pump 7 and are transmitted by means of the pressure fluid, the working piston 3, the piston rod 1 and the draw band 4, to the ring bench. The settable or adjustable hydraulic devices and lines housed in the casing 9 determine—for example, by controlled opening and closing of the safety valve between oil pressure and oil return-flow conduit or by controlled quantity regulators installed in the return conduits for both cylinder chambers, with nonreturn valves switched parallel to them—the stroke speed and, excited by corresponding switching commands of limit switches 10 and 11, also the stroke direction reversal of the ring or spindle bench 6.

The limit switches 10 and 11 are, in turn, operated by the switch-feeler mounted in fixed position on piston rod 1. At the end of a winding process, the switch-feeler 12 may also act on disengaging switch 13, if in the last lowering stroke according to program of the ring bench 6 the limit switch 10 has been, according to program, rendered inoperative.

Displacing members 14 and 15 constructed as threaded spindles move end switches 10 and 11 along a switching path on which blocking switches 16 and 17 and 16' and 17' adjustable in their position are arranged in at a distance apart according to the desired winding form and length. Before the start of the winding operation it is possible on the electrical control part of the apparatus, by means of a selector switch, for the control program corresponding to the desired winding type to be set, so that the blocking switches 16 and 17 and 16' and 17' operated by the limit switches 10 and 11 shifted during the winding process excite relay switches and relays in the electrical control part which, in turn, switch over the hydraulic switching members housed in the casing 9 and also the electric switching elements, for example, switching couplings, in the drive of the threaded spindles 14 and 15, and, respectively, the turning direction of the motor 18 according to the shifting program selected.

The two individually turnable threaded spindles 14 and 15 are driven in common by motor 18 reversible in its turning direction and running continuously during the entire winding operation. Its turning drive takes place according to the invention over an electromagnetically switchable double coupling 19, 20, 21, whose one switching coupling 19, 21 makes possible the switching on of a transmission countershaft 40 onto the drive shaft common to the two threaded spindles and, further, over a reducing or step-up gear 22, from which there branch both a shaft 23 as extension of the threaded spindle 14 and also a shaft 24 which, in turn, over the reversing gear 25, the alternating wheels 26 and 27 and the extension 28, drives the threaded spindle 15. The alternating wheels 26 and 27 may possibly also be replaced by a stageless controllable gear. The reversing gear 25 makes it possible to change the turning direction of the threaded spindle 15 so that threaded spindles 14 and 15 can be switched to turn in the same or in opposite directions. The electromagnetically shiftable double coupling forming the reversing gear 25 in the present example, but not separately represented, is brought into a constant position (for the length of the whole winding process) according to the winding program selected, by a corresponding setting of the selector switch on the electrical control part of the apparatus to the selected winding program. The possibility of changing the two gear wheels 26 and 27 for gear wheels of another reduction (transmission) ratio or the use of a stageless regulatable or adjustable gear means, in cooperation with the reversing gear 25, that the two limit switches 10 and 11, corresponding to each direction change of motor 18, can be driven either with threaded spindles 14 and 15 switched to turn in the same direction, with increasing or decreasing or constant distance apart, simultaneously from right to left or from left to right, or with threaded spindles 14 and 15 switched to turn oppositely, with differing or the same movement dimensions toward or away from each other. The speed at which the limit switches 10 and 11 are moved in the operation determines the particular slope angle of the winding body. It is also entirely possible to shut off completely the drive for the one or the other threaded spindle and thereby to let the limit switch concerned remain unmovable, so that on this machine it is also possible to wind so-called bottle spools.

The axial displacement of the two threaded spindles 14 and 15 during the winding process, by which the especially flat accommodation of the winding body gradient to the surface of the spool shell is achieved takes place by means of a special additional gear connected to gear 22, which additional gear is driven by shaft 23. On the right hand extension 29 (FIG. 2) of shaft 23 there is affixed a disc 30 with a circumferential groove 31. The gear wheel 32 firmly seated on the extension 29 is in engagement with the gear wheel 34 mounted on shaft 33. The worm 35 mounted on shaft 33 drives, over worm wheel 36, the shaft 37 and the cam plate 38 affixed to this. The worm wheel 36 carries on its end surface facing disc 30 an eccentrically mounted follower (carrier) pin 39, which projects into the circumferential groove 31 of disc 30. The distance of the follower pin 39 from the pivot axis of the worm wheel 36 is adjustable. In consequence of this eccentricity, on turning of the worm wheel 36, the shaft extension 29, the shaft 23 and thereby also the threaded spindles firmly connected with each other not, to be sure unturnably, but axially, are moved back and forth in their longitudinal direction. The speed of the reciprocating movement of the disc 30 and thereby of the spindles in a complete rotation of the worm wheel 36 is not uniform, but corresponds to that of a crank drive, in which the speed at the stroke reversal points is equal to zero and reaches its maximum about in the middle of the stroke. This unevenly accelerated or retarded axial movement of the threaded spindles 14 and 15 is superimposed on the uniform movement of the limit switches 10 and 11 coming from the turning of the threaded spindles and produces movement of limit switches 10 and 11 resulting from these two speeds. Through corresponding choice of the transmission ratio of the alternating wheels 32 and 34, the reciprocating movement of the threaded spindles can be adapted to the movements of the limit switches 10 and 11 from the spindle turning as desired. In particular, the superimpositions can be adjusted in such a way that the movement maximum develop on the path ends of limit switches 10 and 11, that is, when the switches 10 and 11 approach their blocking switches 16 and 17 and 16' and 17', respectively, so that thereby slender winding transitions can be achieved in the initial stage and final stage of the winding process. If, in the case of certain winding types, the additional axial movement of the threaded spindles is undesirable, then they can be switched out by sliding the follower pin 39 into the pivot point of the gear wheel and fixing it there. This special gear may, however, also be arranged to be disengageable from gear 22 as a whole, or be provided drivable by itself and be equipped with an engageable drive of its own in order, for example, to be put out of operation during certain periods of the winding operation. The switching coupling 19, 20, which transmits the rotary movements of motor 18 to the drive shaft of gear 22 without interposition of the transmission countershaft 40, and the switching coupling 19, 21, which makes possible the engagement of the countershaft 40 are operated according to the selected winding program by an impulse-producer. The engaging of the coupling is executed there, however, always for only a short time and at brief intervals, whereby a theoretically discontinuous, that is, stagewise displacement of the limit switches 10 and 11 takes place which, however, in its effect can be regarded as a continuous movement. The drive for the accelerated return of the threaded spindles 14 and 15 after completion of the winding process is initiated, if the winding type offers such, after finishing of the winding body, according to program in such a way that at first all the control and adjusting means active up to this moment are switched off or switched over, respectively, the turning direction of motor 18 is reversed by pole-reversal taking place in the electrical control part and the switching coupling 19, 21 of the double coupling is switched on which, for the increase of the return speed, is connected over a transmission countershaft 40 with the drive shaft of gear 22. The return of the limit switches 10 and 11 from their program end position to their starting position for the next winding operation runs now, in contrast to their displacement during the winding build-up, without interruptions and considerably faster.

As impulse-producers for the switching of the coupling 19, 20 there serves in the example represented according to the invention a light barrier 41 operating without contact, with a light source 42 and a photoelectric cell 43, working together with a switching disc 44. The drive of the switching disc 44 takes place at a constant turning rate of motor 18, over the gear wheels 45, 46, 47, 48 to the shaft 49 carrying the switching disc 44. According to FIG. 3, the switching disc 44 carries on its circumference switching tongues (switching segments) 50, which interrupt the light beam from light source 42 striking the photoelectric cell 43, depending on their width, for a greater or lesser period of time. For the duration of the interruption of the light beam the coupling 19, 20 is in each case switched on, and in this manner the rotary movement of the motor 18 is transmitted to the threaded spindles 14 and 15. As long as switching disc 44 is in rotation an engagement of the coupling takes place at each turn (360°) for only a fraction of the turn, i.e. as soon as the tongue of the rotating disc disengages the impulse-producing means. The time of the coupling being engaged in relation to the time of the coupling being disengaged is proportional to the sum of the tongue or window widths in relation to the circumference of disc 44. This ratio is retained whether the turning rate of disc 44 is changed or not. The turns completed per time unit of the threaded spindles 14 and 15 result then from the turning rate of the motor 18, the transmission ratio set between motor 18 and threaded spindles 14 and, in the above engagement time of coupling 19, 20 per time unit determined by the circumferential relation on the switching disc 44. By change of the motor turning rate, for example by pole-reversal, the speed of the threaded spindles can be varied without changing the circumferential ratio between interrupted and uninterrupted light path. In order to accelerate the movement of limit switches 10 and 11, that is, the turns of the threaded spindles 14 and 15 over the whole course of the winding build-up at a constant motor turning rate, the proportion of the light beam interruption at the circumferential length from turn to turn of the switching disc 44 has to become greater. For this purpose the switching disc 51 (FIG. 4) is used with switching tongues 52 whose width increases toward the disc pivot point. The light barrier 41 is caused to move, with progressing winding build-up, in uniform movement radially toward the center of the switching disc 44, whereby the light beam incident upon the photoelectric cell 43 is interrupted for an increasingly long time as the width of the switching tongues 52 increases. The drive for the displacement of the light barrier 41 is accomplished from the curve plate (cam plate) 38 over the rod system 53 to the swinging wedge 54, which turns on the swinging axis 55. Under the pull of spring 56, the light barrier 41 with its bearing pin 57 remains in constant contact with the swinging wedge 54. The form of the curve 38 is determinative for the measure and the time point of the acceleration of the limit switches 10 and 11 and thereby for the influencing of the stroke displacement of the ring bench 6. The superimposition of the two control possibilities (change of the switching tongue width and of the motor turning rate) makes possible an altogether comprehensive program formation. In a winding type for which the shifting of the light barrier 41 is undesired, this device is disengaged by turning the rod 53 to a slight degree on its own axis, lifting it off from the curve (cam) plate 38 and arresting it by means of a holding device (not represented).

Figure 5:
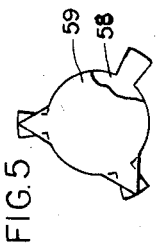
Figure 6:

In FIG. 5 there is represented a switching disc consisting of individual discs 58 and 59, whose effective tongue width can be altered by turning discs 58, 59 against each other (see also FIG. 6).

Obviously many modifications and variations of the invention as hereinbefore set forth may be made without departing from the spirit and scope thereof, and therefore only such limitations should be imposed as are indicated in the appended claims.

I claim:
1. Control means for controlling the stroke of the traverse mechanism of spinning, winding, and ring twist machines which comprises: rotatable displacing members, stroke limiting switches mounted on said displacing members, drive means for said displacing members and impulse-producing means for controlling said drive means, said impulse-producing means including an energy source and a rotating member for periodically interrupting energy from said source.

2. Control means for controlling the stroke of the traverse mechanism of spinning, winding, and ring twist machines which comprises: rotatable displacing members, stroke limiting switches mounted on said displacing members, drive means for said displacing members and impulse-producing means for controlling said drive means, said impulse-producing means including a photoelectric cell and a rotating member for periodically interrupting the light beam produced by said photoelectric cell.

3. Control means for controlling the stroke of the traverse mechanism of spinning, winding, and ring twist machines which comprises: rotatable displacing members, stroke limiting switches mounted on said displacing member, drive means for said displacing member and an electromagnetic impulse-producing means for controlling said drive means, and a rotating disc for altering the induced magnetic flux produced by said electromagnetic impulse-producing means.

4. A control device as in claim 1 wherein said rotating member is a disc provided with switching tongues.

5. A control device as in claim 4 wherein the impulse-producing means and the rotatable disc are adjustably mounted with respect to each other.

6. A control device as in claim 4 wherein the width of the switching tongues of said rotating disc differ at different distances from the center of the disc.

7. A control device as in claim 4 wherein the rotating disc consists of at least two partial discs which are rotatable and fixable against each other, each partial disc being provided with switching tongues.

8. A control device as in claim 1 wherein the drive for the impulse-producing means is provided by an independent, pole-reversible electric motor.

9. A control device as in claim 8 wherein the drive motor for the displacing members simultaneously drives a switching coupling for the drive of said displacing members.

References Cited
UNITED STATES PATENTS

| | | | |
|---|---|---|---|
| 3,042,326 | 7/1962 | Lamb et al. | 242—26.3 |
| 3,109,602 | 11/1963 | Smith | 242—18 |
| 3,169,714 | 2/1965 | Schippers | 242—18 |
| 3,245,215 | 4/1966 | Graf | 242—26.1 X |
| 3,334,828 | 8/1967 | Harrison | 242—26.1 |

STANLEY N. GILREATH, *Primary Examiner.*